United States Patent [19]

Appel et al.

[11] Patent Number: 5,548,357
[45] Date of Patent: Aug. 20, 1996

[54] KEYSTONING AND FOCUS CORRECTION FOR AN OVERHEAD PROJECTOR

[75] Inventors: James J. Appel, Rochester, N.Y.; Daniel H. Greene, Sunnyvale; J. Craig Mudge, Palo Alto, both of Calif.

[73] Assignee: Xerox Corporation, Stamford, Conn.

[21] Appl. No.: 469,034

[22] Filed: Jun. 6, 1995

[51] Int. Cl.$^6$ .................................................. G03B 21/00
[52] U.S. Cl. .................................................. 353/69; 353/70
[58] Field of Search .............................. 359/69, 70, 122, 359/DIG. 3, DIG. 5

[56] References Cited

U.S. PATENT DOCUMENTS

| | | | |
|---|---|---|---|
| 4,002,408 | 1/1977 | Amma | 353/DIG. 3 |
| 4,089,599 | 5/1978 | Kuboshima | 353/70 |
| 4,422,153 | 12/1983 | Arai et al. | 353/70 |
| 4,436,392 | 3/1984 | Vanderwerf | 353/70 |
| 4,436,393 | 3/1984 | Vanderwerf | 353/38 |
| 4,621,371 | 11/1986 | Gotou et al. | 353/69 |
| 4,863,263 | 9/1989 | Kanai | 353/101 |
| 4,946,274 | 8/1990 | Honda | 353/122 |
| 5,220,363 | 6/1993 | Sato et al. | 353/69 |
| 5,414,480 | 5/1995 | Morizumi | 353/70 |
| 5,422,691 | 6/1995 | Ninomiya et al. | 353/70 |

FOREIGN PATENT DOCUMENTS 60-97332   5/1985   Japan .................. 353/DIG. 3

Primary Examiner—William C. Dowling

[57] ABSTRACT

In order to correct for keystoning distortion when projecting a transparency onto a projection screen, computer software is used to deliberately distort an electronic image. A transparency, which can be a slide or a projection panel display such as an LCD panel, is then produced with the intentionally distorted image. The oblique angle between the horizontal plane through the projector and the viewing screen is compensated for by an inverse tapered compression of the electronic image. In one embodiment, a test slide is generated with a plurality of non parallel line pairs, each line pair representing a different distortion correction to an image. The test slide is projected to the screen to be used. A pair of line pairs most parallel to each other is identified. The line pair identification is used to activate the portion of software which generates that particular image distortion. In another embodiment, focus distortion is corrected by placing the transparency on an easel whose angle, relative to the horizontal, is adjustable. The angle of final projection is selected to obtain optimum focus on the screen.

4 Claims, 5 Drawing Sheets

KEYSTONING AND FOCUS CORRECTION FOR AN OVERHEAD PROJECTOR

BACKGROUND OF THE INVENTION AND MATERIAL DISCLOSURE STATEMENT

The present invention relates generally to an overhead projection system and, more specifically, to a method and system for compensating for the keystoning and focus distortion effects of an image projected obliquely onto a vertical screen.

Conventional overhead projectors include a horizontal platen which supports a slide transparency to be projected with a lamp beneath the platen to illuminate the transparency. A projection lens and mirror are mounted above the transparency and direct the light image of the transparency onto a viewing screen. To provide the audience with an unobstructed view, the mirror is commonly tilted to an angle greater than 45° with respect to the horizontal, thereby raising the projected image above the level of the projector. If the viewing screen remains vertical, this projection of the image at an oblique angle above the horizontal results in a magnification distortion of the image into a trapezoidal shape in which the upper portion of the image is wider than the lower portion. Because of the shape of the projected image, this magnification distortion is commonly referred to as "keystoning".

The phenomenon is illustrated with reference to FIG. 1 which shows a side view of an overhead projection system. A projector 2 is placed on a table 4 at a height of, for example, about 3 feet above the floor. Projector 2 includes a platen 6 upon which is placed a transparency 8 to be projected onto a screen 10. The light image of the transparency is projected by lens 12 and reflected by fold mirror 14 along optical axis 16. The center of screen 10 is positioned at a height, say 6 feet, to maximize the visibility of the projected image. Mirror 14 is adjusted by the user to center the image of the slide transparency on the screen. When the center of the projection screen is higher than the height of the fold mirror, the optical axis is tilted upward from the horizontal, as shown in FIG. 1. Since the projection is vertical, the optical axis is not perpendicular to the projection screen. This non-perpendicularity results in a distorted image 8' on the screen as shown in FIG. 2, a horizontal line H at the top of the image will appear longer, on the screen, than a horizontal line H' of equal length (on the transparency), at the bottom of the slide. Parallel vertical lines V, V' will appear to be further apart at the top of the screen than at the bottom of the screen. There will also be focus differences between the top of the screen and the bottom of the screen, although using a projector lens 12 with ample depth of field will eliminate this problem.

Various prior art techniques are known to correct for this keystoning or projected image distortion. U.S. Pat. No. 4,089,599 proposes adding a correcting positive or negative lens between the transparency and the projection lens and adjusting the inclination of the correcting lens to compensate for the obliqueness of the projected image. U.S. Pat. No. 5,220,363 describes the same technique in the context of an enlargement projection apparatus. U.S. Pat. No. 4,436,393 describes a projection system where the projection lens and the fold mirrors are moved from a central position on the optical axis towards the screen while simultaneously diverting the light through the transparency at an oblique angle by offsetting the upper lens of a two-element fresnel condensing lens system. In U.S. Pat. No. 4,863,263 the projection lens and mirror are pivotably movable with respect to each other to adjust for the distortion.

The above prior art describes correction techniques which require the addition of optical components or some rearrangement of the lens and mirror of the projector to correct for keystoning and focus distortion. It would be desirable to correct for these distortions without the requirement for altering the conventional construction and/or operation of an overhead projector.

According to the invention, computer software is used to create a print or transparency which is intentionally distorted, or computer hardware is used to generate a distorted image on a flat panel display. For purposes of description, the term "transparency" will heretofore be used to designate either a slide or a projection panel display. The distortion is intended primarily to compensate for the keystoning introduced in the projection system, but it can also compensate for barrel and pin-cushion distortions. Focus distortions cannot be corrected by intentionally distorting the image, but, according to another aspect of the invention, a focus correction is made by slanting the intentionally distorted image.

In one embodiment of the invention, a test slide, shown in FIG. 3 is projected on the screen where an oblique angle of projection is likely to generate keystone distortion. The viewer chooses which pair of lines looks parallel, and thereby identifies a correcting distortion. Next all slides are printed with that same keystone or projective transformation. An example of a distorted slide 20' is shown in FIG. 4. Alternatively, slides may be printed in advance under a variety of distortions to match the lines on the test template. Finally, when the slide is projected, the contents of the slide appear with little or no distortion on the screen.

More particularly, the present invention relates to a method for correcting for distortion of an image projected by an overhead projector at an oblique angle above a horizontal plane onto a projection screen comprising the steps of:

creating a transparency of an intentionally distorted image, the distortion compensating for the keystoning caused by the oblique angle of projection, and illuminating the transparency and projecting the illuminated image onto said projection screen to form an undistorted image thereon.

DESCRIPTION OF THE INVENTION

Figure 3:
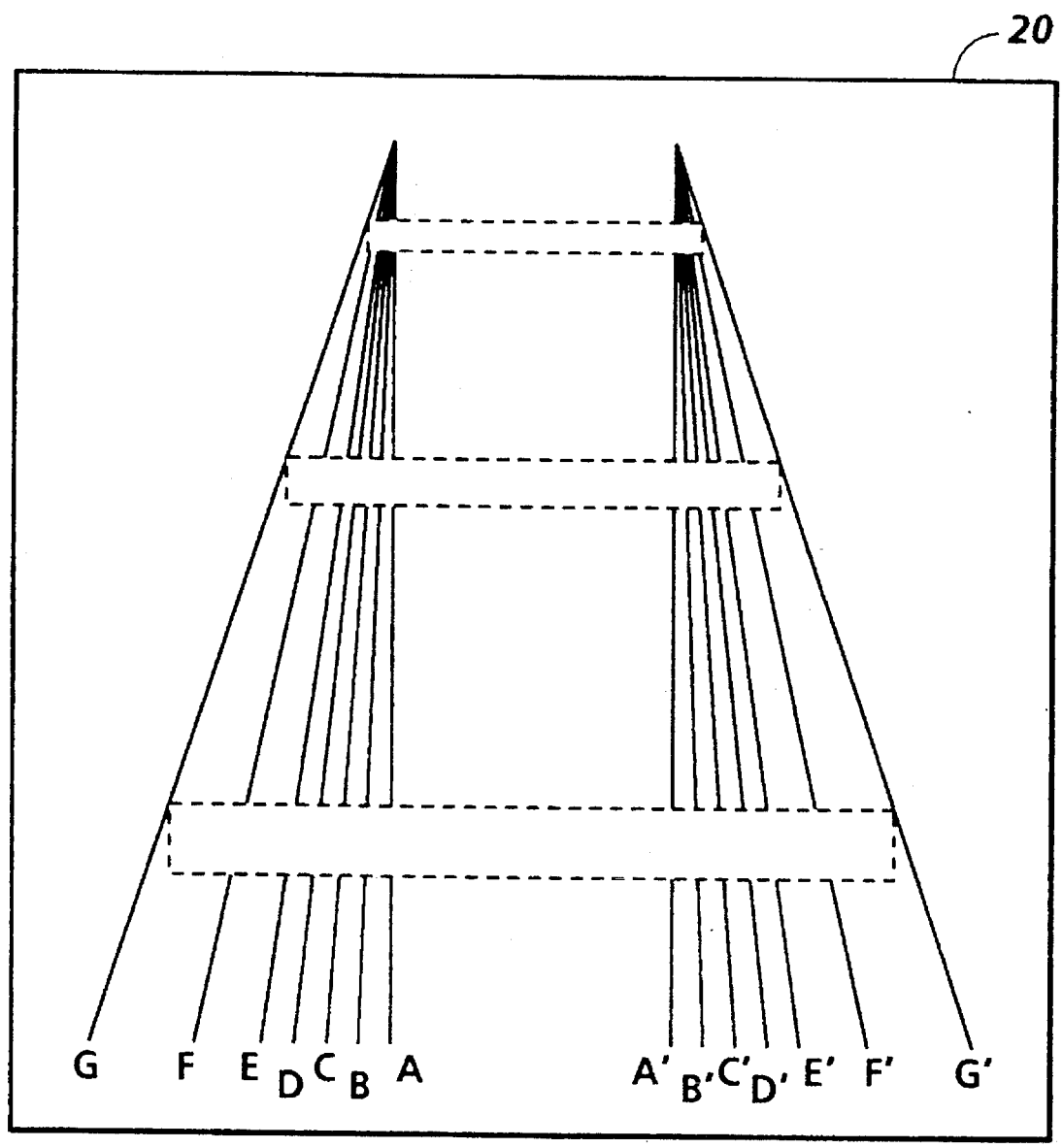
FIG. 3 shows a test slide with a plurality of tapered line pairs, each pair corresponding to a different distortion correction value in computer generated software.

The correction of the keystoning, pin-cushion, barrel and other distortions, is accomplished by creating a software program, or using hardware which operates upon an electronic document image to apply a distortion to that image before it is printed and used as a slide, or projected through an LCD or other projection panel display. The entire distortion necessary to cancel or correct the distortion of the projection system is not always known in advance, and the best distortion may depend on the optics of the projection system, as well as the viewing angle of the audience, so it is convenient to be able to use a test template to discover the best distortion. A Xerox 6085 using Viewpoint software was used to print the test template 20 shown in FIG. 3. Template 20 was created which generated a series of line pairs A–A', B–B', C–C', D–D', E–E', F–F', G–G'. The line pairs collectively comprise progressively compressed, tapered images with oblique sides, each set of sides corresponding to an oblique projection angle. Each line pair represents a specific inverse correction value that is applied to the entire electronic document used to produce the print 20. While 7 line pairs are shown, it is understood more or less can be generated; if the projector and screen configuration is in a fixed location, an optimum line pair can be selected and used repeatedly. The test print 20 is made into a slide and is placed on the projector to be used and the light image directed to the screen. The projected screen image is then examined and the line pairs which are closest to being in parallel alignment (keystone corrected) are identified. Assuming line pairs C–C' are closest to parallel alignment, the software correction program corresponding to line pairs C–C' is activated and a print of the electronic document of the image to be developed is generated. The print will have the inverse distortion corresponding to C–C' and, when displayed on the screen will be free of distortion.

Alternatively, the test template can be displayed on an LCD or other projection electronic display (hereafter called projection panel displays), and once a good distortion is determined, all subsequent material is displayed with that distortion. It will be understood that with an electronically displayed test template a variety of user interfaces are possible; for example, a single test pattern can be displayed and adjusted dynamically by the user until no distortion is observed.

Figure 4:
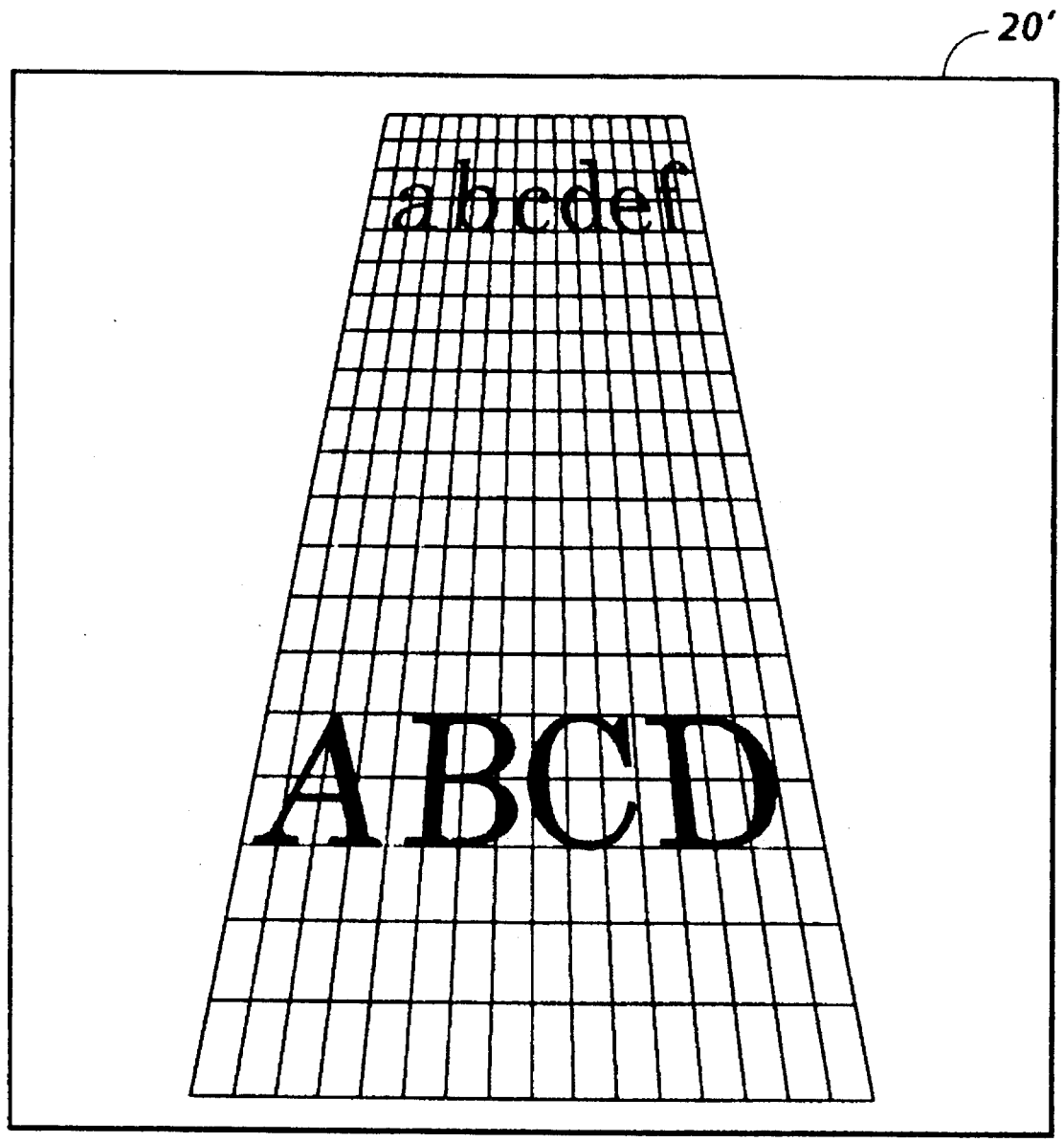
FIG. 4 illustrates a pre-printed distorted slide.

The distortion of the image can depend on the image specification. If the image is described with a page description language, then the distortion can be applied to the coordinates of the graphics before they are rendered. Fonts are distorted by transforming the coordinates of the points used to define the character spline outlines, and then rendering the outlines to recreate the characters. The results of this distortion is shown in FIG. 4. If the image is continuous tone or the image description language is unknown, then it can be treated as a sampled image, and resampled under the appropriate transformation. After transformation, the distorted image will cancel the effects of the distortion in the projection system.

Figure 1:
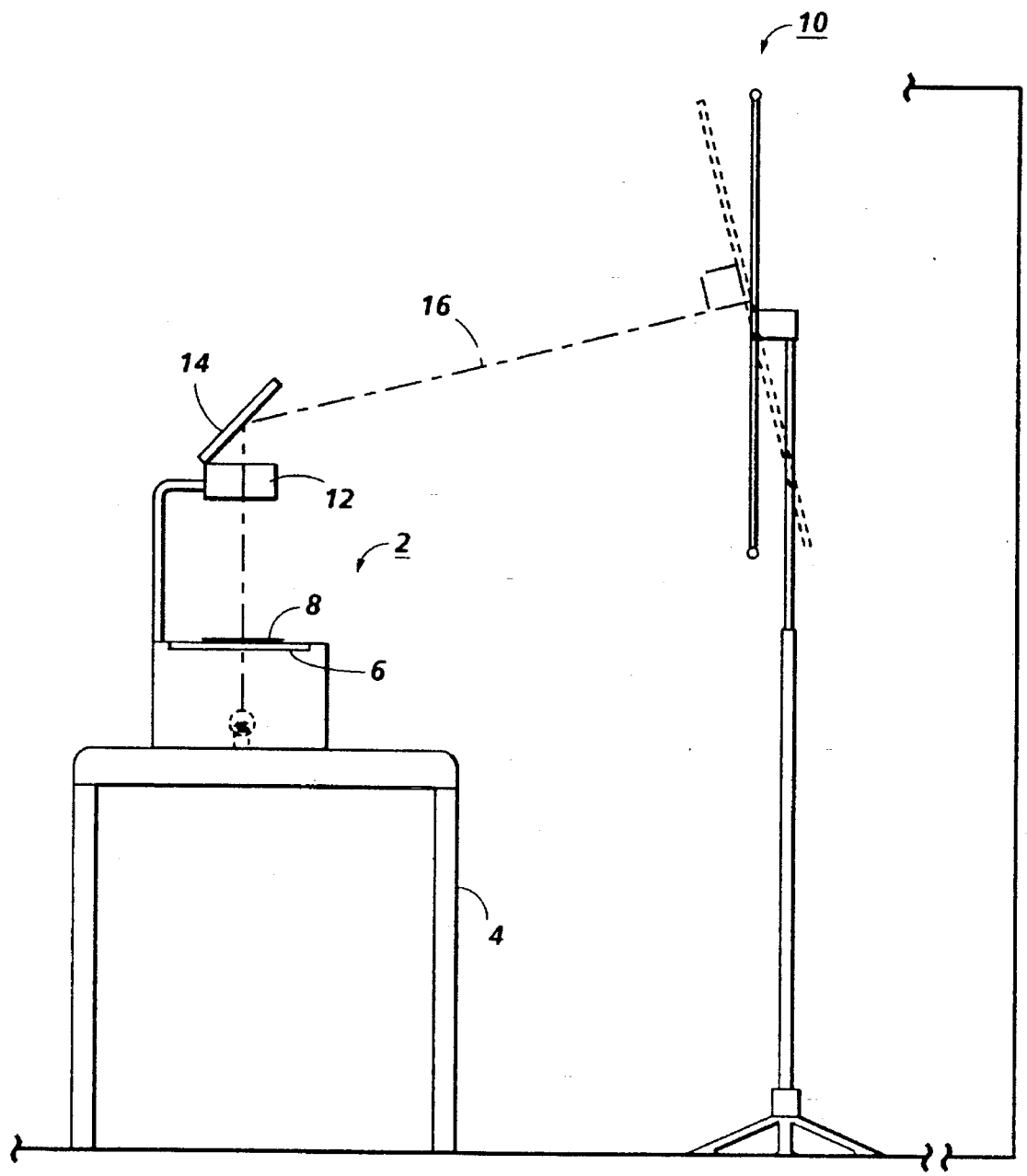
FIG. 1 illustrates a prior art overhead projection system.
Figure 2:
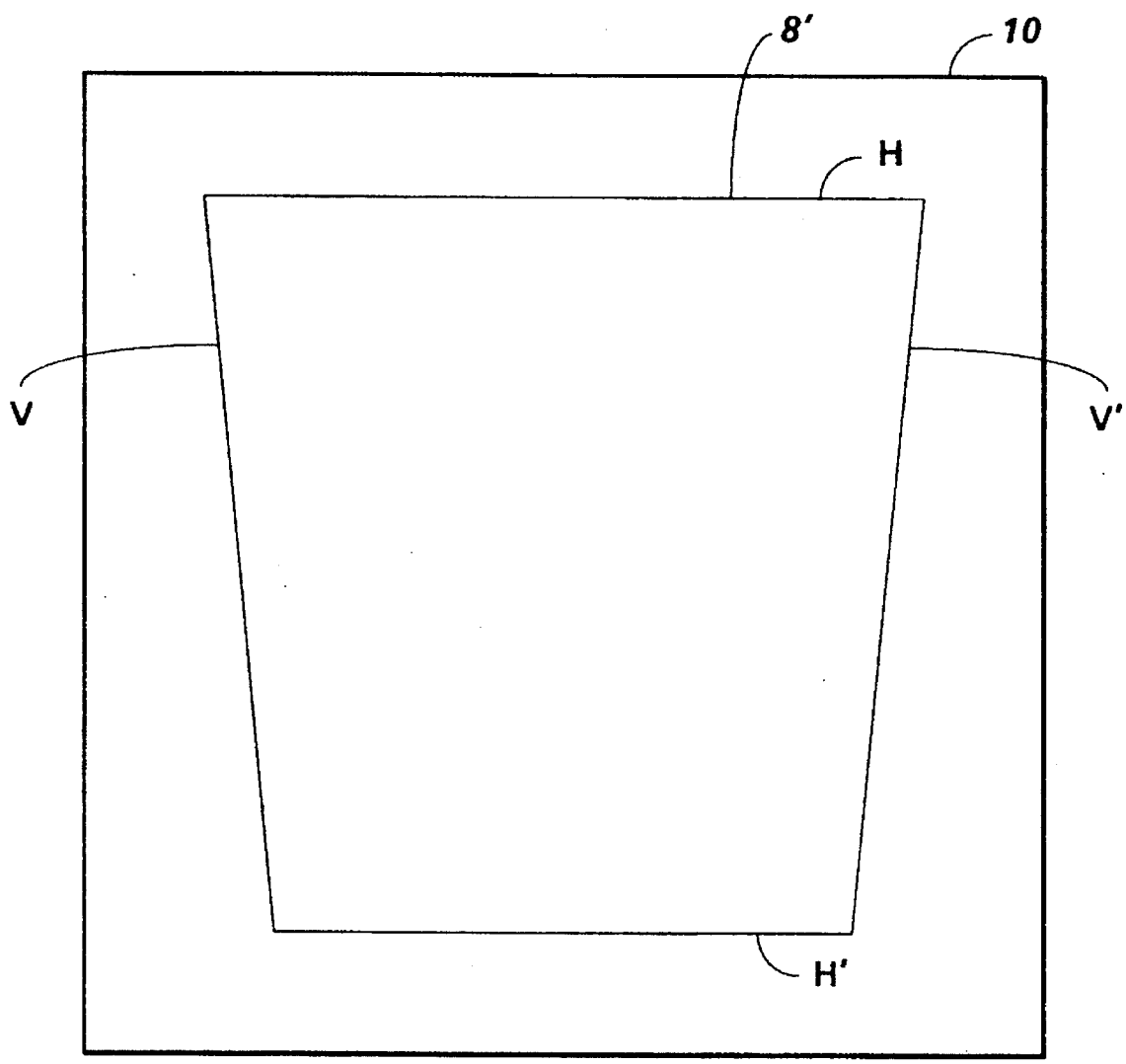
FIG. 2 illustrates projection of a transparency image from the FIG. 1 system onto a vertical screen to illustrate the keystoning distortion.

Focus distortion occurs when the image plane is not parallel to the plane through the projection screen 10 shown in FIG. 1. This can be avoided using one or more of the following techniques. If the depth of focus of the lens is sufficient to cover the range of focal distance, then no focus distortion will occur. However, it is not always desirable to use a lens with large depth of focus, so other solutions are useful. The screen can be slanted forward so it is parallel to the image plane. The image would then be entirely in focus, and no keystone distortion would be introduced by the projection system, although a keystone distortion may still be useful to correct for the effects of an oblique viewing angle for the audience. Finally, according to another aspect of the invention, focus distortion can be corrected by placing the printed slide or projection panel display on a clear slanted easel. FIG. 5 shows a projection system having some of the same components as the FIG. 1 system.

Figure 5A:
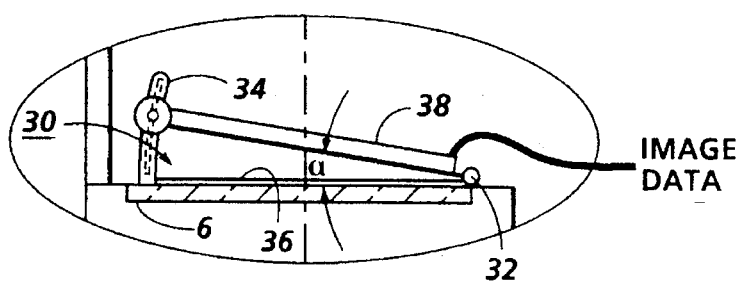
FIG. 5a shows an enlarged view of the easel of FIG. 4 and the image data connection to a projection panel.
Figure 5:
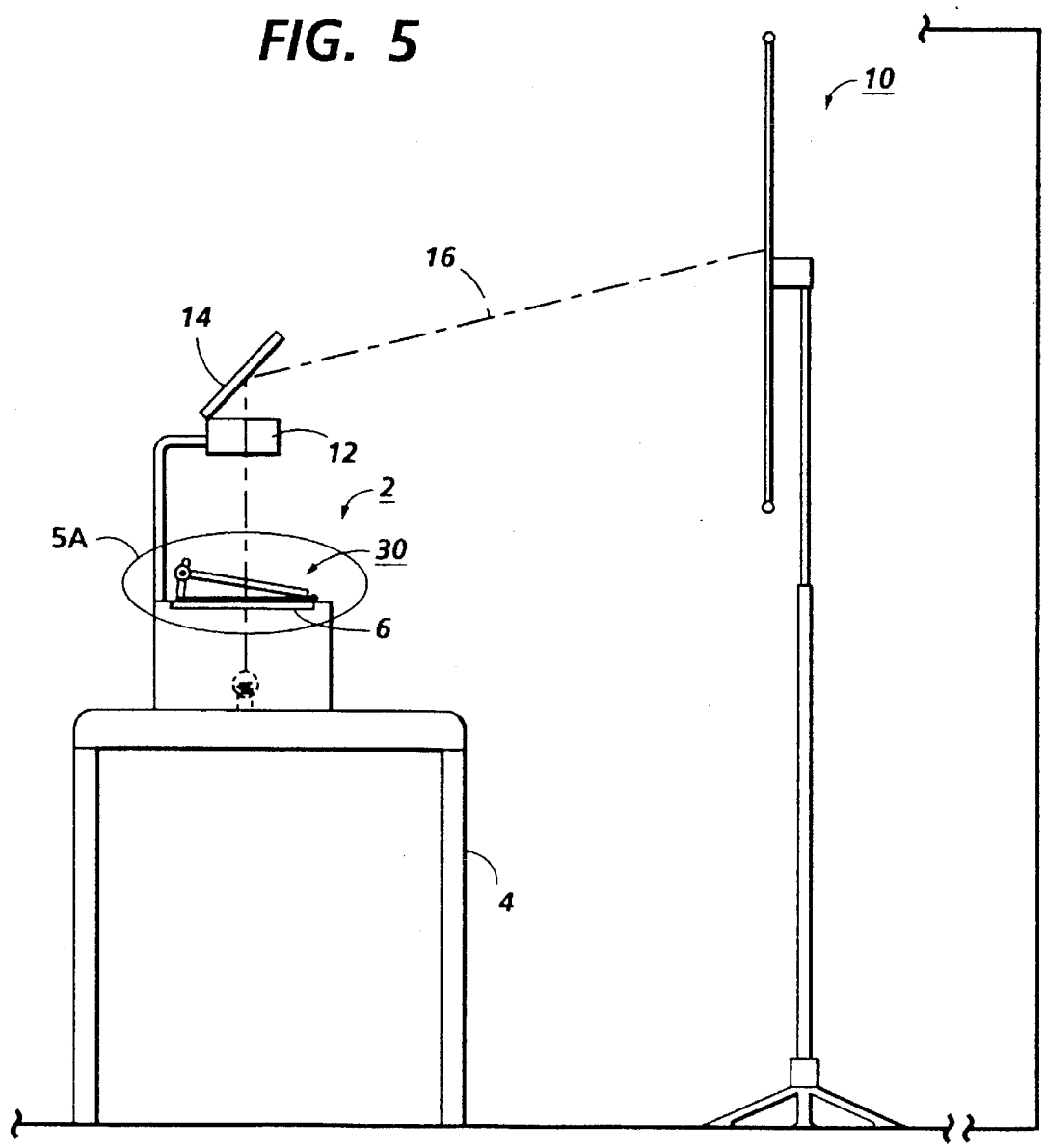
FIG. 5 shows a projection system which includes an adjustably slanted easel for applying focus correction to a projected image.

According to the invention, an easel 30, shown enlarged in FIG. 5a, is placed upon the platen 6. Easel 30 is pivotable about point 32 to provide a transparency support at an adjustable angle in a clockwise direction. A calibrated ratchet 34 supports the easel at a selected angle α. Underneath the slanted surface, there is room on the horizontal surface of the projector for the placement of a graded neutral density filter 36. This filter compensates for the intensity variation of the keystone distortion of the transparency 38 which, for this embodiment, is an LCD panel connected to a source of image data to create the distorted image. The ratchet position (combined with other fixed parameters such as the focal length of the lens) determines the graded filter and the distortion to be applied to the slides. The graded filter could be a mechanical device constructed as multiple layers of translucent film; a frame holding the layers permits telescoped expansion to a distance determined by the angle alpha. The above techniques can be combined in a variety of ways to allow existing projection systems to be used at oblique projection and viewing angles without significant distortion of the viewed image.

While the embodiments disclosed herein are preferred, it will be appreciated from this teaching that various alternative, modifications, variations or improvements therein may be made by those skilled in the art, which are intended to be encompassed by the following claims.

We claim:

1. A method for correcting for distortion of an image projected by an overhead projector at an oblique angle above a horizontal plane onto a projection screen comprising the steps of:

creating a transparency of an intentionally distorted image, the distortion compensating for the keystoning caused by the oblique angle of projection;

placing the transparency on an easel having an adjustable angle with respect to the horizontal;

adjusting the easel angle to correct for focus distortion; and illuminating the transparency and projecting the illuminated image onto said projection screen to form an undistorted image thereon; and compensating for keystone intensity variations across the transparency by placing a graded neutral density filter beneath the easel.

2. A method for correcting for distortion of an image projected by an overhead projector at an oblique angle above a horizontal plane onto a projection screen comprising the steps of:

creating a plurality of progressively compressed tapered images with oblique sides, each set of oblique sides corresponding to an oblique projection angle, selecting one of said plurality of tapered images corresponding to the inverse of the oblique projection angle, modifying an electronic image to be projected so as to change the electronic image to create a distorted image, making a print of the distorted electronic image, and projecting the distorted print onto the projection screen to produce a distortion free projected image.

3. The method of claim 2 including the further steps of:

creating a test print which includes a plurality of line pairs, each line pair corresponding to one of said tapered correction images, projecting the test print onto the screen, identifying the line pair which appears to be parallel, and selecting the software which will modify the electronic image to produce the distortion represented by the identified line pair.

4. A system for correcting for focus distortions in a overhead transparency projector wherein a transparency is placed on a horizontal surface and illuminated and projected at an oblique angle onto a projection screen, the system including an easel positioned above the horizontal surface, the easel being adjustable to support the transparency at an angle to the horizontal which projects the image in proper focus onto the screen, the system further including a graded neutral density filter placed beneath said easel, the filter compensating for the intensity variations of keystone distortion.

* * * * *